Patented June 25, 1935

UNITED STATES PATENT OFFICE 2,006,022

DYESTUFF OF THE QUINOPHTHALONE SERIES OF GOOD FASTNESS TO LIGHT

Georg Kränzlein, Frankfort-on-the-Main, Hans Schlichenmaier, Kelkheim in Taunus, and Ludwig Schörnig, Frankfort-on-the-Main, Germany, assignors to General Aniline Works, Inc., New York, N. Y., a corporation of Delaware No Drawing. Application November 14, 1933, Serial No. 698,016. In Germany November 18, 1932

5 Claims. (Cl. 260—40)

The present invention relates to dyestuffs of the quinophthalone series of good fastness to light.

It is known that by condensation of quinaldine with phthalic acid anhydride yellow compounds are obtainable which may be used, either as such or after their sulfonation, as acid wool dyestuffs.

Now, we have found that dyestuffs which have a much better fastness to light are obtainable by condensing a quinaldine, containing in the 3-position a hydroxy-group, with the anhydride or the imide of a dicarboxylic acid or a derivative thereof and sulfonating, if required, the condensation product thus obtained. The sulfonation may be effected in known manner, for instance, by treating the condensation product with fuming sulfuric acid containing about 60–100% of $SO_3$ at temperatures below about $+15°$ C., while cooling externally.

There is thus obtained, for instance, by condensation of 3-hydroxy-2-methylquinoline of the formula:

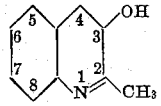

with phthalic acid anhydride a yellow compound which, when sulfonated, dyes wool yellow tints of very good fastness to light. By introducing into the molecule of 2-methyl-3-hydroxy-quinoline further substituents, for instance, a sulfonic acid group, new acid wool dyestuffs which are fast to light are obtained by condensation with phthalic acid anhydride.

Other variations are possible by introducing other substituents, for instance, an amino group into, for instance, the 4-position. The said group may be acylated or arylated and new manifold dyestuffs are obtainable by condensation with an acid anhydride. By causing 2 - methyl - 3 - hydroxy-4-amino-quinoline to react with, for instance, 1-hydroxy-2-carboxy-benzene-4-sulfonic acid chloride, there are obtained, after condensation with the anhydride, dyestuffs which contain groups capable of being chromed.

By using instead of phthalic acid anhydride a derivative thereof, for instance, 3-chlorophthalic acid anhydride or 3,6-dichlorophthalic acid anhydride, there are obtained in an analogous manner similar dyestuffs of good fastness to light.

As dicarboxylic acid anhydrides there may also be used polycarboxylic acid anhydrides, such as tetra-carboxylic acid anhydrides, for instance, pyromellitic acid anhydride, as well as naphthalene-1,2,5,6-tetracarboxylic acid- or mellitic acid anhydride. The dyestuffs thus obtained, when sulfonated, also dye cotton.

The dyestuffs may be halogenated subsequently, either before or after the sulfonation. The dyestuffs obtainable according to the present invention are new and may be characterized, for instance, by the following general formula:

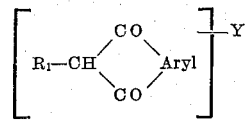

wherein $R_1$ represents a 3-hydroxy-quinolyl radical bound in 2-position,

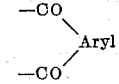

represents the radical of an ortho-dicarboxylic acid of the benzene and naphthalene series and Y means that the compounds may be sulfonated.

The following examples serve to illustrate the invention, but they are not intended to limit it thereto, the parts being by weight:

(1) 255 parts of 2-methyl-3-hydroxyquinoline are introduced at 200° C. into 200 parts of phthalic acid anhydride and the molten mass is stirred for 1 to 2 hours at about 250° C. The dark-yellow reaction product is sublimated. The first sublimation product is non-reacted phthalic acid anhydride and then the 3-hydroxy-quinophthalone is obtained at about 370° C. and under a pressure of about 1 mm. of mercury. The latter product forms dark yellow needles melting at 265° C. which dissolve in glacial acetic acid, chlorobenzene and other organic solvents and crystallize therefrom in an easy manner. Instead of removing the phthalic acid anhydride from the reaction mass by sublimation, it is also possible to extract it by boiling the melt with water and to recrystallize, for further purification, the insoluble quinophthalone after sublimation may have taken place. The yield of pure crystallized hydroxyquinophthalone is good. In order to sulfonate it, 20 parts of hydroxyquinophthalone are introduced into 300 parts of fuming sulfuric acid (containing 60% of $SO_3$) and the whole is stirred for half-an-hour, at about $+5°$ C. The sulfonation mixture is poured on about 500 parts of ice. On addition of sodium chloride, the sulfonic acid separates in the form of a yellow precipitate. The whole is filtered with suction and the solid matter is washed with a solution of sodium chloride until neutral. In the dry state, the product forms a yellow powder which dyes wool from an acid bath yellow tints very fast to light.

(2) 50 parts of phthalic acid anhydride are heated for 6 hours at 180° C. together with 16 parts of beta-hydroxyquinaldine and 15 parts of zinc chloride. The brown melt obtained is poured into water, the whole is heated to boiling after addition of a small quantity of hydrochloric acid and the brown crude product is filtered with suction. After recrystallization from glacial acetic acid, it melts at 263° C. to 265° C. and is identical with the product obtainable according to Example 1.

(3) 58 parts of 3-hydroxyquinophthalone, obtainable according to Example 1, are dissolved in 3500 parts of glacial acetic acid and, at boiling temperature, 36 parts of bromine are added. After a short time, the precipitation of yellow crystals sets in; at the same time, hydrobromic acid escapes. When the evolution of hydrobromic acid has ceased, the whole is allowed to cool, the brominated hydroxyquinophthalone is filtered with suction, washed with glacial acetic acid and dried. It forms yellow needles which melt at 248° C. It contains 22% of bromine, a proportion corresponding to a monobromo compound. In organic solvents it dissolves much more difficultly than does its non-brominated starting compound. To effect the sulfonation, 5 parts of bromohydroxyquinophthalone are introduced at 0° C. to +5° C. into 160 parts of fuming sulfuric acid (containing 60% of $SO_3$) and the whole is stirred for ¼ to ½ hour. The sulfonation mixture is then poured on about 800 parts of ice and the sulfonic acid is completely precipitated as indicated in Example 1 or by addition of sodium sulfate. In order to purify it, it may be dissolved in hot water and reprecipitated by means of potassium chloride. It dyes wool yellow tints which are fast to light.

(4) 100 parts of phthalic acid anhydride are molten and at 200° C. 10 parts of 3-hydroxyquinaldine-sulfonic acid (obtainable by sulfonation of 3-hydroxyquinaldine) are introduced. The whole is heated for 6 hours at 210° C. to 220° C. By heating the dark-yellow melt in vacuo, the phthalic acid anhydride sublimates. The dyestuff is obtained in the form of a yellow powder which dyes wool light yellow tints.

(5) 279 parts of 4-benzoylamino-3-hydroxy-2-methylquinoline (obtainable from 3-hydroxy-2-methylquinoline by coupling with diazotized aniline, reducing and splitting up the azo dyestuff obtained and causing the base to react with benzoylchloride) are introduced into 2500 parts of phthalic acid anhydride at about 185° C. and the melt is stirred for about half an hour. It is then poured out, pulverized after cooling and ground in a ball mill with 10000 parts of water. The ground product is filtered with suction and purified by extracting it with boiling water. The yield obtained is good. Recrystallized from glacial acetic acid, the product forms fine yellow needles melting at 315° C. 80 parts of the product thus obtained are introduced into 1300 parts of fuming sulfuric acid (containing 60% of $SO_3$) and the whole is stirred for 3 hours at 0° C. to +5° C. The sulfonation mixture is poured on 8000 parts of ice and the precipitation of the sulfonic acid is accelerated by addition of potassium chloride. After filtration with suction and washing with potassium chloride until neutral, the sulfonic acid is purified by dissolving it in boiling water and precipitating it by means of potassium chloride solution. The sulfonic acid dyes wool greenish-yellow tints. By using in the above reaction of amino-hydroxyquinaldine with benzoyl chloride instead of the latter substance 1-hydroxy-2-carboxy-benzene-4-sulfonic acid chloride, there are obtained in an analogous manner dyestuff sulfonic acids containing groups capable of being chromed.

(6) 64 parts of beta-hydroxyquinaldine are molten together with 80 parts of 3-chlorophthalic acid anhydride and heated for about half-an-hour at 220° C. to 235° C. whereby a small quantity of water escapes while the mass froths feebly as it is also the case with the other melts. The dark yellow reaction product is sublimated under a pressure of about 0.5 mm. of mercury and at about 350° C. and is obtained in the form of scarlet-red small needles. It melts at 255° C. and may be recrystallized easily from chlorobenzene, glacial acetic acid and other organic solvents. In order to sulfonate it, it is advantageous to stir 2 parts with 64 parts of fuming sulfuric acid containing 60% of $SO_3$ for half-an-hour at 0° C. to +5° C. The sulfonation mixture is poured on 400 parts of ice. The acid solution obtained is warmed, filtered and about 100 parts of concentrated caustic soda solution of 40° Bé. are added to the filtrate. After standing for a short time, the sulfonic acid precipitates in the form of fine small needles which are filtered with suction and washed with sodium chloride solution. It dyes wool from an acid bath yellow tints which are fast to light.

(7) 48 parts of 3-hydroxyquinaldine are heated with 72 parts of 3,6-dichlorophthalic acid anhydride as indicated in Example 6. The brown melt may advantageously be worked up in the manner described in Example 6. The condensation product melts at 235° C. The sulfonation is advantageously effected in the manner indicated in one of the foregoing examples. There is obtained an acid dyestuff which dyes wool yellow tints which are fast to light.

(8) 11 parts of pyromellitic acid anhydride are heated to boiling with 32 parts of 3-hydroxyquinaldine and 900 parts of trichlorobenzene. In the course of 1 to 2 hours 500 parts of trichlorobenzene and a small quantity of water which has been formed are distilled off. The condensation product precipitates in the form of fine brown needles. After cooling, it is filtered with suction, washed with alcohol and may be further purified by boiling it out with very diluted sodium carbonate solution. The condensation product forms a brown crystalline powder. It dissolves only difficultly in most of the organic solvents, even in the heat. In order to sulfonate it, 3 parts are introduced into 50 parts of fuming sulfuric acid containing 60% of $SO_3$ and stirred for half-an-hour at +5° C. The sulfonation mixture is decomposed by means of 300 parts of ice. Thereby, the sulfonic acid partly precipitates. By addition of sodium chloride, the precipitation is accelerated. The yellow precipitate is filtered with suction, purified by extracting it with boiling water and again precipitated by means of sodium chloride. The dyestuff obtained dyes wool and cotton yellow tints of very good fastness to light.

(9) By using in the foregoing examples, instead of the aromatic dicarboxylic acid anhydrides mentioned therein, aliphatic or alicyclic dicarboxylic acid anhydrides, dyestuffs of similar properties are obtained.

(10) 600 parts of phthalic acid anhydride are molten and, while stirring, 300 parts of 2-methyl- 3-hydroxyquinoline-4-carboxylic acid are added thereto at 240° C. to 245° C. The whole is then stirred for about 1 hour. Thereby, carbon dioxide and water are split off and 3-hydroxyquinophthalone is formed which may easily be obtained with a good yield and in a pure state. It is identical with the unsulfonated product obtainable according to Example 1 and may be used as pigment dyestuff which is fast to light or for coloring lakes and benzine. By sulfonating it as indicated in Example 1, a sulfonic acid is obtained which is identical with that obtainable according to Example 1.

(11) 17.5 parts of 4-amino-3-hydroxy-2-methyl-quinoline, (obtainable by reducing and splitting up the azo-dyestuff from diazotized sulfanilic acid and 3-hydroxy-2-methyl-quinoline) are boiled gently for ¼ hour together with 40 parts of chlorbenzene and 11 parts of aceticanhydride. On cooling, the 4-acetyl-amino-3-hydroxy-2-methyl-quinoline precipitates in the form of greyish-white crystals which melt at 220° C. to 223° C.

20 parts of 4-acetyl-amino-3-hydroxy-2-methyl-quinoline are introduced into 200 parts of molten phthalic acid anhydride at about 200° C. and the whole is stirred for about 1 hour. The melt is then allowed to cool, pulverized and extracted by boiling with water. The quinophthalone which has been formed, is obtained in the form of a brown residue. It is purified by recrystallizing it from nitrobenzene and then forms orange-yellow needles which melt at 265° C. to 267° C.

In order to sulfonate the quinophthalone thus obtained, 2 parts thereof are introduced at 0° C. to +5° C. into 20 parts of fuming sulfuric acid containing 65% of SO₃ and the whole is stirred for 2 hours. The sulfonation mass is poured on 200 parts of ice and may be treated subsequently as indicated in Example 6. The dyestuff is thus obtained in the form of a yellow powder which dyes wool from an acid bath fast yellow tints.

We claim:
1. The compounds of the general formula:

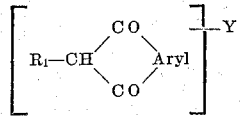

wherein R₁ represents a 3-hydroxy-quinolyl-radical bound in 2-position,

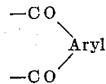

represents the radical of an ortho-dicarboxylic acid of the benzene and naphthalene series and Y means that the compounds may be sulfonated.

2. The compounds of the general formula:

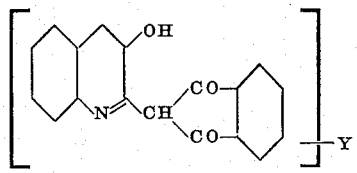

wherein the benzene nucleus may contain halogen and Y means that the compounds may be sulfonated.

3. The compound of the formula:

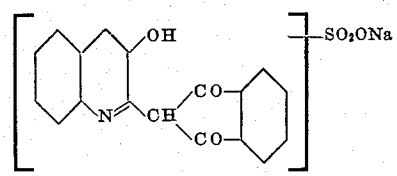

forming in the dry state a yellow powder which dyes wool from an acid bath yellow tints of very good fastness to light.

4. The compound of the formula:

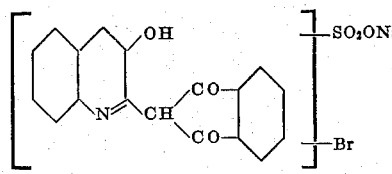

dyeing wool yellow tints of good fastness to light.

5. The compound of the following formula:

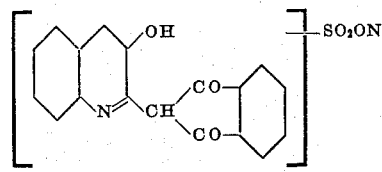

dyeing wool yellow tints of good fastness to light.

GEORG KRÄNZLEIN.
HANS SCHLICHENMAIER.
LUDWIG SCHÖRNIG.

Certificate of Correction

Patent No. 2,006,022.  June 25, 1935.

GEORG KRÄNZLEIN ET AL.

It is hereby certified that error appears in the printed specification of the above numbered patent requiring correction as follows: Page 3, second column, lines 42 to 49, inclusive, claim 5, the formula should appear as shown below instead of as in the printed patent:

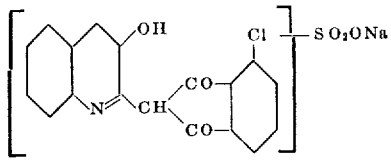

and that the said Letters Patent should be read with this correction therein that the same may conform to the record of the case in the Patent Office.

Signed and sealed this 30th day of March, A. D. 1937.

[SEAL]

HENRY VAN ARSDALE,
*Acting Commissioner of Patents.*